(12) United States Patent
Ishii

(10) Patent No.: US 7,619,699 B2
(45) Date of Patent: Nov. 17, 2009

(54) ELECTRO-OPTICAL DEVICE AND ELECTRONIC APPARATUS

(75) Inventor: Tatsuya Ishii, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 11/758,305

(22) Filed: Jun. 5, 2007

(65) Prior Publication Data

US 2008/0068525 A1 Mar. 20, 2008

(30) Foreign Application Priority Data

Jul. 25, 2006 (JP) ............................. 2006-201666

(51) Int. Cl.
G02F 1/136 (2006.01)
(52) U.S. Cl. .................... 349/44; 349/42; 349/143
(58) Field of Classification Search ............ 349/42–44, 349/143
See application file for complete search history.

(56) References Cited

U.S. PATENT DOCUMENTS

| | | | |
|---|---|---|---|
| 5,986,723 A * | 11/1999 | Nakamura et al. ............ 349/39 |
| 6,610,997 B2 | 8/2003 | Murade | |
| 6,809,338 B2 | 10/2004 | Murade | |
| 2002/0175888 A1 * | 11/2002 | Murade ....................... 345/92 |
| 2003/0206265 A1 * | 11/2003 | Yasukawa et al. .......... 349/187 |
| 2005/0001945 A1 * | 1/2005 | Iki .............................. 349/44 |
| 2005/0088596 A1 * | 4/2005 | Shimizu et al. ............. 349/139 |

FOREIGN PATENT DOCUMENTS

| JP | A 09-171196 | 6/1997 |
|---|---|---|
| JP | A-2001-330859 | 11/2001 |

* cited by examiner

Primary Examiner—Ellen Kim
(74) Attorney, Agent, or Firm—Oliff & Berridge, PLC (57) ABSTRACT

An electro-optical device includes light-shielding portions interposed between pixel electrodes and transistors. Each light-shielding portion includes an overlapping portion that overlaps and is wider than the corresponding transistor. A contact hole that connects each pixel electrode with the corresponding transistor overlaps the overlapping portion of the light-shielding portion.

8 Claims, 6 Drawing Sheets

ELECTRO-OPTICAL DEVICE AND ELECTRONIC APPARATUS

BACKGROUND

1. Technical Field

The present invention relates to electro-optical devices, such as liquid crystal devices, and to electronic apparatuses including the electro-optical devices, such as liquid crystal projectors.

2. Related Art

As an example of such electro-optical devices, liquid crystal devices are often used, for example, as optical modulators (light valves) in projection display devices. Particularly, in the case of a projection display device, since intense light emitted from a light source enters a liquid crystal light valve, in order to prevent the light from causing an increase in leakage currents, incorrect operations, or the like at thin-film transistors (TFTs) in the liquid crystal light valve, a light-blocking film is provided in the liquid crystal light valve as a light-blocking portion that blocks incident light. More specifically, for example, the light-blocking film is formed of at least portions of conductive films forming data lines and scanning lines extending vertically and horizontally in a display region, and various electronic elements including TFTs for the individual pixels electrically connected to the scanning lines and the data lines in order to drive the individual pixels. Alternatively or in addition, the light-blocking film is formed separately as a grid-shaped or stripe-shaped pattern corresponding to the planar pattern of the data lines and the scanning lines as a light-blocking portion that is provided simply to block incident light. In addition to preventing occurrence of leakage currents to improve the quality of displayed images as described above, for example, the light-blocking film also serves to prevent light from being emitted outward at boundaries of adjacent pixels, where the orientation of liquid crystal tends to be unstable so that orientation defects could occur.

According to JP-A-9-171196, in a region where such a light-blocking film is formed on a substrate, i.e., in a non-aperture region on the substrate where light does not transmit, in order to electrically interconnect a TFT and a pixel electrode at each pixel, a contact hole is formed through an inter-layer insulating film insulating the layer of the pixel electrode from the lower layer of various lines and electronic elements such as TFTs.

However, with the configuration of the contact hole disclosed in JP-A-9-171196, when viewed in plan on the substrate, a portion of the light-blocking film is formed merely to allocate a region for forming the contact hole, irrelevantly to the intended function of achieving favorable image display. Thus, the size of the aperture region at each pixel is restricted, so that the numerical aperture is reduced. This causes degradation of the quality of displayed images.

SUMMARY

An advantage of some aspects of the invention is that, in an electro-optical device, such as an active-matrix liquid crystal device, and in an electronic device including the electro-optical device, it is possible to achieve a high numerical aperture while alleviating occurrence of light leakage currents at TFTs.

According to an aspect of the invention, there is provided an electro-optical device. The electro-optical device includes a substrate, a plurality of data lines and a plurality of scanning lines, a plurality of pixel electrodes, a plurality of transistors, and a plurality of light-blocking portions. The data lines and the scanning lines are provided on the substrate and cross each other. The pixel electrodes are provided on the substrate individually at a plurality of pixels. The pixels are defined in association with intersections of the data lines and the scanning lines and constitute a display region on the substrate. The transistors control switching of the pixel electrodes. The transistors are provided on the substrate in non-aperture regions separating individual aperture regions of the pixels, and each of the transistors is formed along a first direction in the display region. The light-blocking portions are provided on the substrate in a layer below the pixel electrodes via an inter-layer insulating film and above the transistors so as to define the non-aperture regions at least partially. Each of the light-blocking portions has an overlapping portion. The overlapping portion includes a portion that overlaps an associated one of the transistors along the first direction when viewed in plan on the substrate and is wider than the associated one of the transistors with respect to a second direction crossing the first direction. The pixel electrodes are electrically connected to the transistors individually via a plurality of contact holes formed through the inter-layer insulating film. Each of the contact holes is located so as to overlap the overlapping portion of an associated one of the light-blocking portions when viewed in plan on the substrate.

With the electro-optical device described above, for example, it is possible to achieve image display by active-matrix driving, in which supply of image signals from data lines to pixel electrodes is controlled. More specifically, each pixel is selected when a scanning signal is supplied from a scanning line to the gate electrode of an associated transistor. When one source-drain region of the semiconductor layer of the transistor is electrically connected to a data line and the other source-drain region is electrically connected to the pixel electrode, an image signal is supplied from the data line to the pixel electrode via the transistor.

An "aperture region" herein substantially refers to a region in a pixel from which light is emitted outward for display. In the aperture region, a pixel electrode is formed of a transparent conductive material, such as indium tin oxide (ITO), so that light can transmit therethrough. In the aperture region, it is possible to change the intensity of outgoing light that transmits through an electro-optical material such as liquid crystal by changing the transmission factor. That is, an "aperture region" refers to a region where light collected at a pixel is not blocked by a light-blocking member, such as lines, light-blocking films, or various other elements that do not transmit light or that have a lower optical transmission factor than the transparent electrode. On the other hand, a "non-aperture region" herein refers a region where light that contributes to display does not transmit. For example, the non-aperture region refers to a region in a pixel where a non-transparent light-blocking member, such as lines, electrodes, or various other elements, are provided. Furthermore, a "numerical aperture" refers to the ratio of the aperture region to the size of the pixel including the aperture region and the non-aperture region.

The pixel electrodes are arranged to form a matrix corresponding to the intersections of the data lines and the scanning lines, in a region that is supposed to serve as a display region on the substrate. Furthermore, at each pixel, the data line, the scanning line, the transistor, and various other elements for driving the pixel electrode are formed in the non-aperture region.

The transistor is formed along a first direction in the display region. The "first direction" herein refers to, for example, a row direction of the plurality of pixels arranged to form a matrix on the substrate, i.e., a direction of array of the plurality of data lines or a direction in which each of the plurality of scanning lines extends (i.e., an X direction), or a column direction of the plurality of pixels arranged to form a matrix on the substrate, i.e., a direction of array of the plurality of scanning lines or a direction in which each of the plurality of data lines extends (i.e., a Y direction).

The light-blocking portion at each pixel is formed in a layer below the pixel electrode via an inter-layer insulating film and above the transistor so as to define the non-aperture region at least partially. Furthermore, at least the overlapping portion of the light-blocking portion overlaps at least a portion of the transistor along the first direction when viewed in plan on the substrate. Furthermore, the overlapping portion is wider than the transistor along a second direction crossing the first direction. That is, the overlapping region is formed so as to cover the transistor at least partially. Thus, at each pixel on the substrate, at least a portion of the transistor can be shielded from incident light by the overlapping portion of the light-blocking portion. This serves to reduce light that enters the transistor. Accordingly, occurrence of a light leakage current at the transistor can be alleviated. Particularly, for example, by disposing the overlapping portion so as to overlap a region where a light leakage current is empirically likely to occur so that the region is shielded from incident light, occurrence of a light leakage current can be alleviated more effectively.

Furthermore, on the substrate, above the light-blocking portion and below the pixel electrode, an inter-layer insulating film is formed so as to insulate the layer of the pixel electrode from the layer of the light-blocking film (or the transistor), the data line, and the scanning line.

Through the inter-layer insulating film, a contact hole is formed at a position overlapping the overlapping portion when viewed in plan on the substrate. The pixel electrode is electrically connected to the transistor via the contact hole. For example, the overlapping portion of the light-blocking portion is electrically connected to the pixel electrode via the contact hole so as to relay the electrically connection between the transistor and the pixel electrode. In this configuration, the inter-layer insulating film may be a single-layer film or a multi-layer film having two or more layers. More specifically, the pixel electrode is formed continuously from the interior of the contact hole to the exterior of the contact hole, so that, in the contact hole, the pixel electrode is electrically connected to the overlapping portion of the light-blocking portion or another conductive film that relays the electrical connection between the semiconductor layer and the pixel electrode, provided under the pixel electrode. Alternatively, without limitation, a plug may be formed by filling the contact hole with a conductive material while forming the pixel electrode in contact with the surface of the plug exposed from the contact hole, thereby electrically connecting the pixel electrode to the overlapping portion of the light-blocking portion or another conductive film.

In the electro-optical device according to the aspect of the invention, of the non-aperture region, a contact hole is located in a region where the transistor is shielded from incident light in order to prevent occurrence of a light leakage current (i.e., a region where the overlapping portion of the light-blocking portion is formed). Thus, it is not needed to increase the size of a portion of the non-opening region merely to allocate a region for the contact hole. This serves to increase the size of the aperture region at each pixel.

As described above, with the electro-optical device according to the aspect of the invention, it is possible to increase the numerical aperture at each pixel while alleviating occurrence of a light leakage current. This serves to achieve high-quality display.

Preferably, in the electro-optical device, each of the plurality of light-blocking portions is formed of a light-blocking conductive material, is electrically connected to an associated one of the plurality of transistors, and is electrically connected to an associated one of the plurality of pixel electrodes via an associated one of the plurality of contact holes.

With this configuration, the overlapping portion of the light blocking portion can be formed so as to serve as a relaying layer that relays the electrical connection between the transistor and the pixel electrode. In this case, compared with a case where the electrical connection between the transistor and the pixel electrode is formed via another conductive film, the configuration for the electrical connection between the transistor and the pixel electrode does not become complex due to the additional conductive film or an associated contact hole. Thus, the manufacturing process of the electro-optical device can be simplified more effectively. Furthermore, a larger area can be allocated for the aperture region at each pixel.

Also preferably, in the electro-optical device, the overlapping portion has a wider portion having a larger width along the second direction than another portion of the overlapping portion, and each of the plurality of contact holes is located so as to overlap the wider portion of the overlapping portion of an associated one of the plurality of light-blocking portions when viewed in plan on the substrate.

With this configuration, in the overlapping portion of the light-blocking portion, the wider portion shields the transistor from incident light in a wider range than the other portions of the overlapping portion, so that the amount of light that enters the transistor can be reduced further.

Furthermore, since the contact hole is located so as to overlap the wider portion of the overlapping portion when viewed in plan on the substrate, it is not needed to enlarge the size of the overlapping portion of the light-blocking portion in order to allocate the contact hole in a portion other than the wider portion. Furthermore, for example, it is readily possible to align the contact hole with the overlapping portion during manufacturing of the electro-optical device, it is possible to prevent reduction in yield due to misalignment of the contact hole. This is advantageous in manufacturing.

When the overlapping portion has a wider portion as described above, each of the plurality of transistors may include a semiconductor layer having a channel region, a data-line-side source-drain region electrically connected to an associated one of the plurality of data lines, a pixel-electrode-side source-drain region electrically connected to an associated one of the plurality of pixel electrodes, a first junction region formed between the channel region and the data-line-side source-drain region, and a second junction region formed between the channel region and the pixel-electrode-side source-drain region, with the wider-portion overlapping at least the second junction region when viewed in plan on the substrate.

In this case, the following advantage is achieved. With this configuration, in the semiconductor layer of the transistor, the first junction region is formed at the junction between the channel region and the data-line-side source-drain region, and the second junction region is formed at the junction between the channel region and the pixel-electrode-side source-drain region. That is, the first and second junction regions refer to, for example, PN junction regions of an NPN or PNP (i.e., N-channel or P-channel) transistor or lightly doped drain (LDD) regions (impurity regions doped with impurities by ion implantation or the like) of a transistor having an LDD structure.

According to researches conducted by the inventors of the invention of this application, empirically, light leakage currents are more likely to occur in the second junction region than in the first junction region. With the configuration described above, in the overlapping portion of the light-blocking portion, the wider portion shields the second junction region from incident light in a larger range, so that the amount of light that enters the second junction region can be reduced further. Accordingly, occurrence of light leakage currents in the transistor can be prevented more effectively.

When the wider portion overlaps the second junction region of the semiconductor layer as described above, the second junction region may be a lightly doped drain region.

In this case, in a transistor having an LDD structure, OFF currents that flow in the data-line-side source-drain region and the pixel-electrode-side source-drain region when the transistor is OFF can be reduced, and reduction in ON currents that flow in these regions when the transistor is ON can be alleviated.

In the electro-optical device according to this aspect, for example, each of the plurality of light-blocking portions is a capacitor having a lower capacitor electrode and an upper capacitor electrode stacked in that order from a lower side on the substrate, one electrode of the lower capacitor electrode and the upper capacitor electrode being electrically connected to an associated one of the plurality of pixel electrodes, and the overlapping portion is formed as a portion of the one electrode.

With this configuration, an image signal supplied to the pixel electrode is supplied to one of the upper and lower capacitor electrodes of the capacitor, so that the capacitor functions as a hold capacitor that temporarily holds the potential of the pixel electrode. Thus, it is possible to improve the performance for holding the pixel electrode at each pixel at a potential corresponding to an image signal.

Furthermore, with this configuration, the capacitor also functions as a light-blocking portion. Thus, compared with a case where a light-blocking film is provided separately, it is possible to further simplify the configuration at each pixel regarding the data line, the scanning line, the transistor, and other elements.

When the light-blocking portion is a capacitor as described above, for example, the one electrode is the lower capacitor electrode.

In this case, since a portion of the lower capacitor electrode shields the transistor from incident light, occurrence of light leakage currents at the transistor can be alleviated. Furthermore, by allocating the contact hole in a region where the transistor is shielded from incident light in order to prevent occurrence of light leakage currents, defined by the portion of the lower capacitor electrode as described above, it is not needed to enlarge the size of the lower capacitor electrode of the capacitor merely for the allocation of the contact hole.

When the light-blocking portion is a capacitor as described above, each of the upper capacitor electrode and the lower capacitor electrode may be formed of a metallic film.

In this case, the capacitor has a metal-insulator-metal (MIM) structure including layers of a metallic film, a dielectric film (insulating film), and a metallic film. With the capacitor configured as described above, power consumption by the pair of upper and lower capacitor electrodes caused with various signals supplied thereto can be reduced. Furthermore, compared with a case where one of the pair of capacitor electrodes is formed of the semiconductor layer, the conductivity of the one electrode is improved, so that the performance of the capacitor as a hold capacitor can be improved.

According to another aspect of the invention, there is provided an electronic apparatus including the electro-optical device described above (any of the configurations described above).

Since the electronic apparatus including the electro-optical device described above, it is possible to implement an electronic apparatus with favorable display quality, such as a projection display apparatus, a cellular phone, an electronic notebook, a word processor, a view-finder or monitor-direct-viewing video tape recorder, a workstation, a video phone, a point-of-sale (POS) terminal, or a touch panel. Furthermore, as an electronic apparatus according to the invention, for example, it is possible to implement an electrophoresis apparatus, such as electronic paper.

Other operations and advantages of the invention will become apparent from the following description of embodiments of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, an embodiment of the invention will be described with reference to the drawings. As an example of an electro-optical device, this embodiment relates to a liquid crystal device having internal driving circuits and employing a TFT active-matrix driving method.

Figure 1:
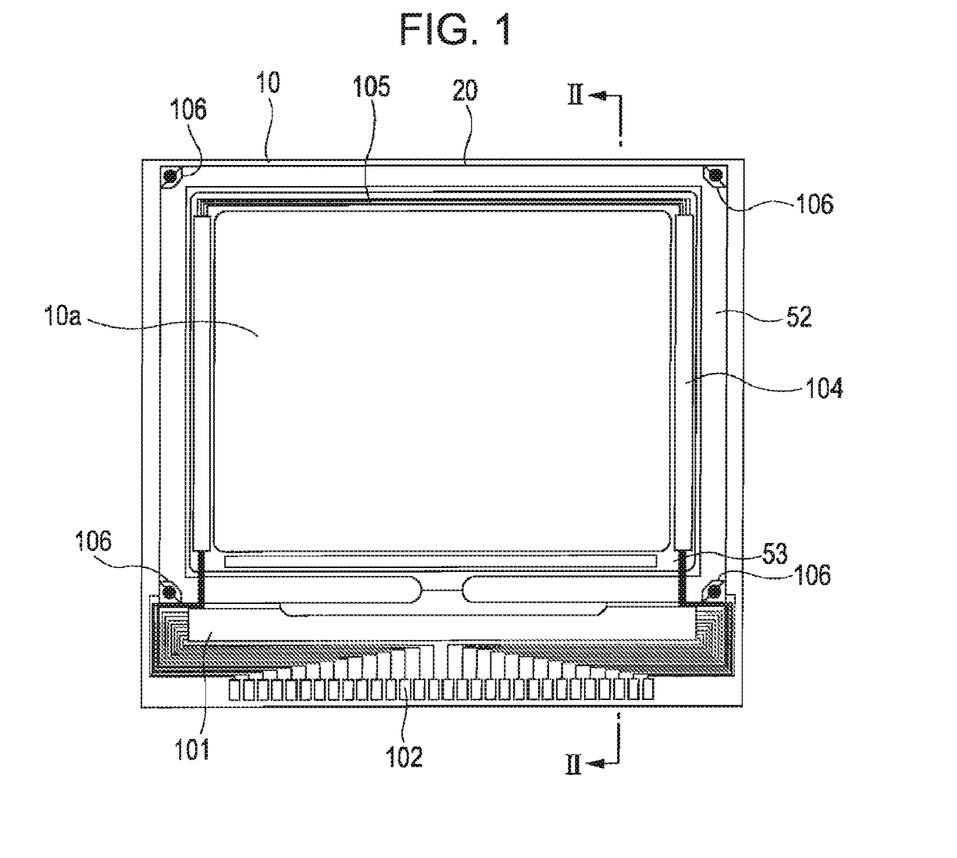
FIG. 1 is a schematic plan view of a liquid crystal device.
Figure 2:
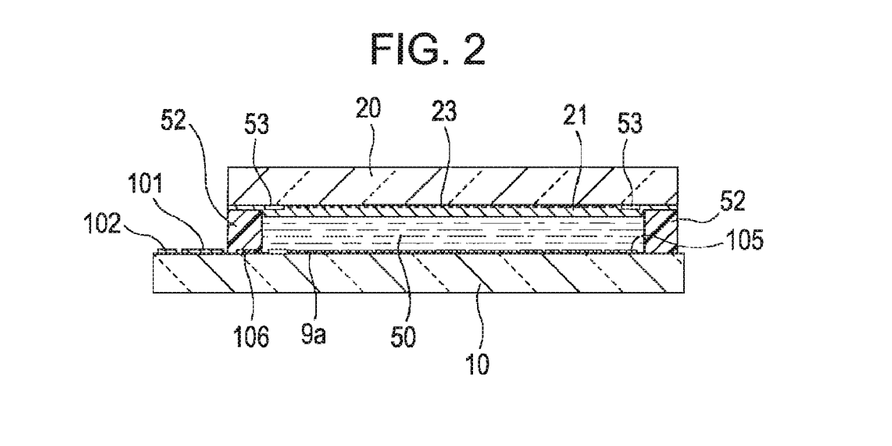
FIG. 2 is a sectional view taken along a line II-II in FIG. 1.

First, the overall configuration of the liquid crystal device according to this embodiment will be described with reference to FIGS. 1 and 2. FIG. 1 is a plan view showing a TFT array substrate together with elements formed thereon, as viewed from the side of an opposing substrate. FIG. 2 is a sectional view taken along a line II-II in FIG. 1.

Referring to FIGS. 1 and 2, in the liquid crystal device according to this embodiment, a TFT-array substrate 10 and an opposing substrate 20 are disposed opposing each other. Between the TFT-array substrate 10 and the opposing substrate 20, liquid crystal is encapsulated to form a liquid crystal layer 50. The TFT-array substrate 10 and the opposing substrate 20 are bonded with each other via a sealing member 52 provided in a sealing region. The sealing region is located around an image display region 10a, which is an example of a "display region" in the invention.

The sealing member 52 is composed of an ultraviolet curing resin, a thermosetting resin, or the like for bonding the TFT-array substrate 10 and the opposing substrate 20 with each other. The sealing member 52 is formed by applying such a material onto the TFT-array substrate 10 and curing the material by ultraviolet irradiation, heating, or the like in a manufacturing process. In the sealing member 52, gap members (not shown) composed of glass fibers or glass beads are dispersed so that a predetermined gap is provided between the TFT-array substrate 10 and the TFT-array substrate 10 (i.e., an inter-substrate gap). The liquid crystal device according to this embodiment can be used suitably, for example, as a small-sized light valve of a projector for displaying an enlarged image.

Inside and in parallel to the sealing region where the sealing member 52 is disposed, a frame-shaped light-blocking film 53 defining a frame region of the image display region 10a is provided on the opposing substrate 20. Alternatively, the frame-shaped light-blocking film 53 may be formed entirely or partially on the TFT-array substrate 10 as an internal light-blocking film.

Of a peripheral region located around the image display region 10a on the TFT-array substrate 10, in a region located outside the sealing region where the sealing member 52 is disposed, a data-line driving circuit 101 and external-circuit connecting terminals 102 are provided along one edge of the TFT-array substrate 10. Furthermore, two scanning-line driving circuits 104 are provided along two edges of the TFT-array substrate 10 adjacent to the one edge mentioned above, and are covered by the frame-shaped light-blocking film 53. Furthermore, in order to interconnect the two scanning-line driving circuits 104 provided on either side of the image display region 10a, a plurality of lines 105 is provided along the remaining one edge of the TFT-array substrate 10, and is covered by the frame-shaped light-blocking film 53.

In regions at the four corners on the opposing substrate 20, vertical-conduction members 106 are provided to achieve vertical electrical conduction between the TFT-array substrate 10 and the opposing substrate 20. On the other hand, on the TFT-array substrate 10, in regions opposing the corner regions on the opposing substrate 20, vertical-conduction terminals (not shown) are provided. Thus, electrical conduction between the TFT-array substrate 10 and the opposing substrate 20 can be achieved.

Referring to FIG. 2, on the TFT-array substrate 10, an alignment film (not shown) is formed over pixel electrodes 9a having formed therewith TFTs for pixel switching, scanning lines, data lines, etc. Although the pixel switching elements are implemented by TFTs in this embodiment, the pixel switching elements may be implemented by various types of transistors, thin-film diodes (TFDs), or the like. On the other hand, on the opposing substrate 20, an opposing electrode 21, a grid-shaped or stripe-shaped light-blocking film 23, and an alignment film (not shown) at an uppermost layer are provided. The liquid crystal layer 50 is composed of, for example, one type of nematic liquid crystal or a combination of more than one type of nematic liquid crystal, and exhibits a predetermined orientation between the pair of alignment films.

The TFT-array substrate 10 is a transparent substrate, such as a quartz substrate, a glass substrate, or a silicon substrate. The opposing substrate 20 is also a transparent substrate, similarly to the TFT-array substrate 10.

On the TFT-array substrate 10, the pixel electrodes 9a are provided, and an alignment film that has undergone a certain orientation process, such as rubbing, is provided over the pixel electrodes 9a. For example, the pixel electrodes 9a are formed out of a transparent conductive film, such as an ITO film, and the alignment film is formed of an organic film, such as a polyimide film.

On the opposing substrate 20, the opposing electrode is formed, for example, over the entire surface thereof. Under the opposing electrode 21, an alignment film that has undergone a certain orientation process, such as rubbing, is provided. For example, the opposing electrode 21 is formed of a transparent conductive film, such as an ITO film, and the alignment film is formed of an organic film, such as a polyimide film.

On the opposing substrate 20, a grid-shaped or stripe-shaped light-blocking film 23 may be provided. With this configuration, together with various conductive films composed of light-blocking materials and constituting various elements on the TFT-array substrate 10, such as data lines, scanning lines, storage capacitors, etc., light that is incident from the side of the TFT-array substrate 10 can be prevented more reliably from entering channel regions 1a' of TFTs and neighboring regions thereof.

Between the TFT-array substrate 10 and the TFT-array substrate 10 configured as described above and disposed so that the pixel electrodes 9a and the opposing electrode 21 oppose each other, the liquid crystal layer 50 is formed. The liquid crystal layer 50 is caused to exhibit a predetermined orientation by the alignment films when no electric field is applied by the pixel electrodes 9a.

On the TFT-array substrate 10 shown in FIGS. 1 and 2, in addition to the driving circuits such as the data-line driving circuit 101 and the scanning-line driving circuits 104, a sampling circuits that samples image signals on image signal lines and supplies the image signals to data lines, a precharging circuit that supplies precharging signals at a predetermined voltage level to data lines before image signals are supplied, a testing circuit for testing the quality, defects, or the like of the electro-optical device during manufacturing or at the time of shipping, etc. may be provided.

Figure 3:
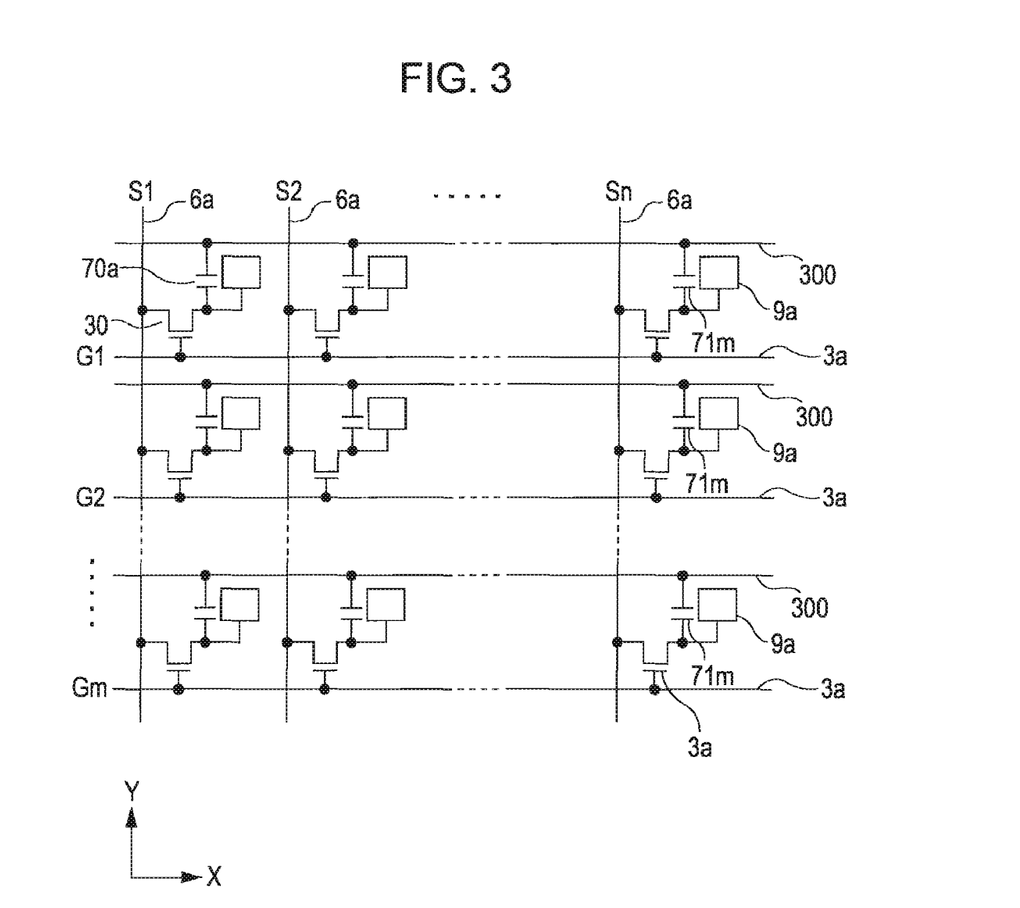
FIG. 3 is a circuit diagram showing an equivalent circuit of various elements, lines, and so forth in a plurality of pixel portions.

Next, the electrical connection in pixel portions of the liquid crystal device according to this embodiment will be described with reference to FIG. 3. FIG. 3 is an equivalent circuit diagram of various elements, lines, etc. in a plurality of pixel portions arranged to form a matrix constituting an image display region of the liquid crystal device according to this embodiment.

Referring to FIG. 3, at each of a plurality of pixels arranged to form a matrix constituting the image display region 10a on the TFT-array substrate 10, a pixel electrode 9a and a TFT 30 are provided. The TFT 30 is an example of a "transistor" in the invention. The TFT 30 is electrically connected to the pixel electrode 9a. The TFT 30 controls switching of the pixel electrode 9a during operation of the liquid crystal device. A data line 6a, through which an image signal is supplied, is electrically connected to a data-line-side source-drain region in a semiconductor layer of the TFT 30 as will be described later. Image signals S1, S2, . . . , Sn written to the data lines 6a may be supplied sequentially line by line in this order, or in groups to sets of adjacent data lines 6a.

The gate of the TFT 30 is electrically connected to a scanning line 3a. The liquid crystal device is configured so that pulses of scanning signals G1, G2, . . . , Gm are applied to the scanning lines 3a sequentially in this order at specific timings. The pixel electrode 9a is electrically connected to a pixel-electrode-side source-drain region of the TFT 30, as will be described later. Each of the TFTs 30 serving as switching elements is turned on for a predetermined period, whereby the image signals S1, S2, Sn supplied from the data lines 6a are written at specific timings. The image signals S1, S2, . . . , Sn having certain levels, written to the liquid crystal via the pixel electrodes 9a, are maintained for a predetermined period between the pixel electrodes 9a and the opposing electrode 21 formed on the opposing substrate 20. The liquid crystal is an example of an electro-optical material.

The liquid crystal constituting the liquid crystal layer 50 changes the orientation or order of its molecules according to the levels of voltages applied thereto, thereby modulating light to achieve multi-level display. In the normally white mode, the transmittance of incident light decreases in accordance with voltages applied to the individual pixels. On the other hand, in the normally black mode, the transmittance of incident light increases in accordance with voltages applied to the individual pixels. Thus, as a whole, light having contrast according to image signals is output from the liquid crystal device. In order to prevent leakage of the image signals maintained between the pixel electrodes 9a and the opposing electrode 21, for each of the liquid crystal capacitors formed between the pixel electrodes 9a and the opposing electrodes 9a, a storage capacitor 70a is electrically connected in parallel, The storage capacitor 70a is an example of a "light-blocking portion" in the invention. The storage capacitors 70a serve to temporarily maintain the potentials of the individual pixel electrodes 9a according to image signals supplied, With the storage capacitors 70a, the characteristics for maintaining potentials at the pixel electrodes 9a are improved. This serves to achieve improved display characteristics, such as enhanced contrast and reduced flicker.

Figure 4:
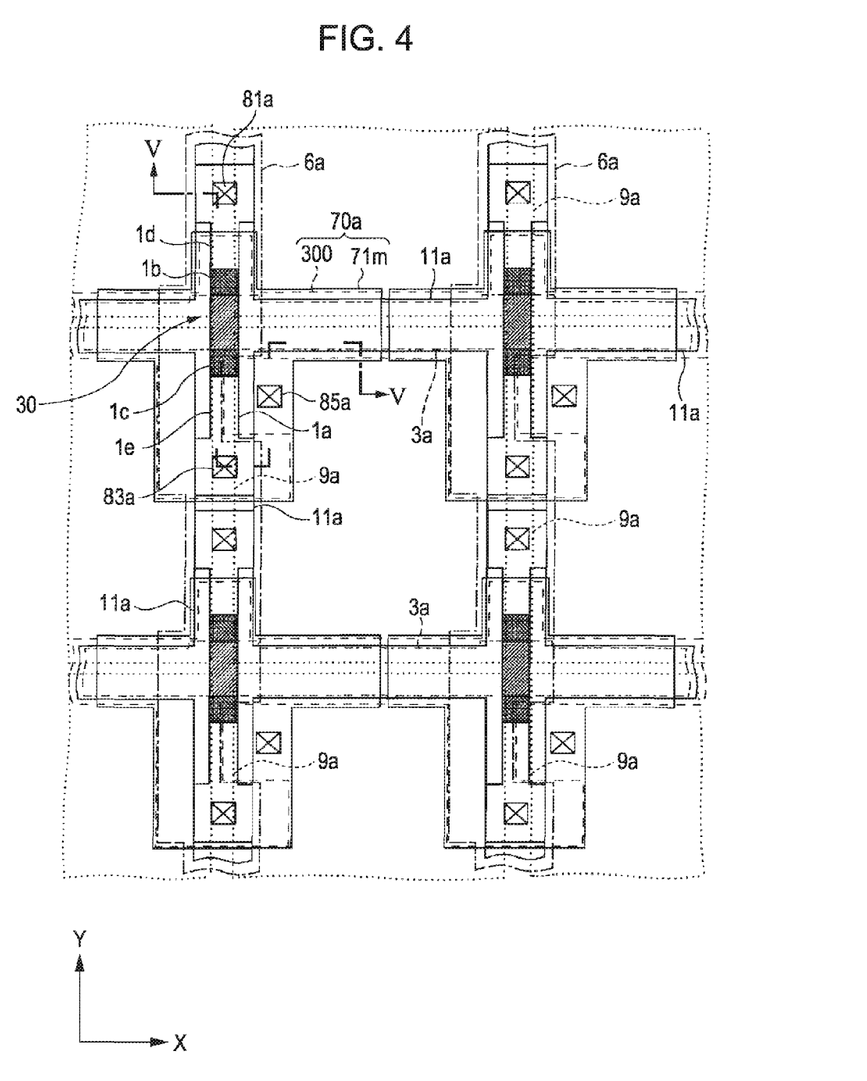
FIG. 4 is a plan view of a plurality of adjacent pixel portions.
Figure 5:
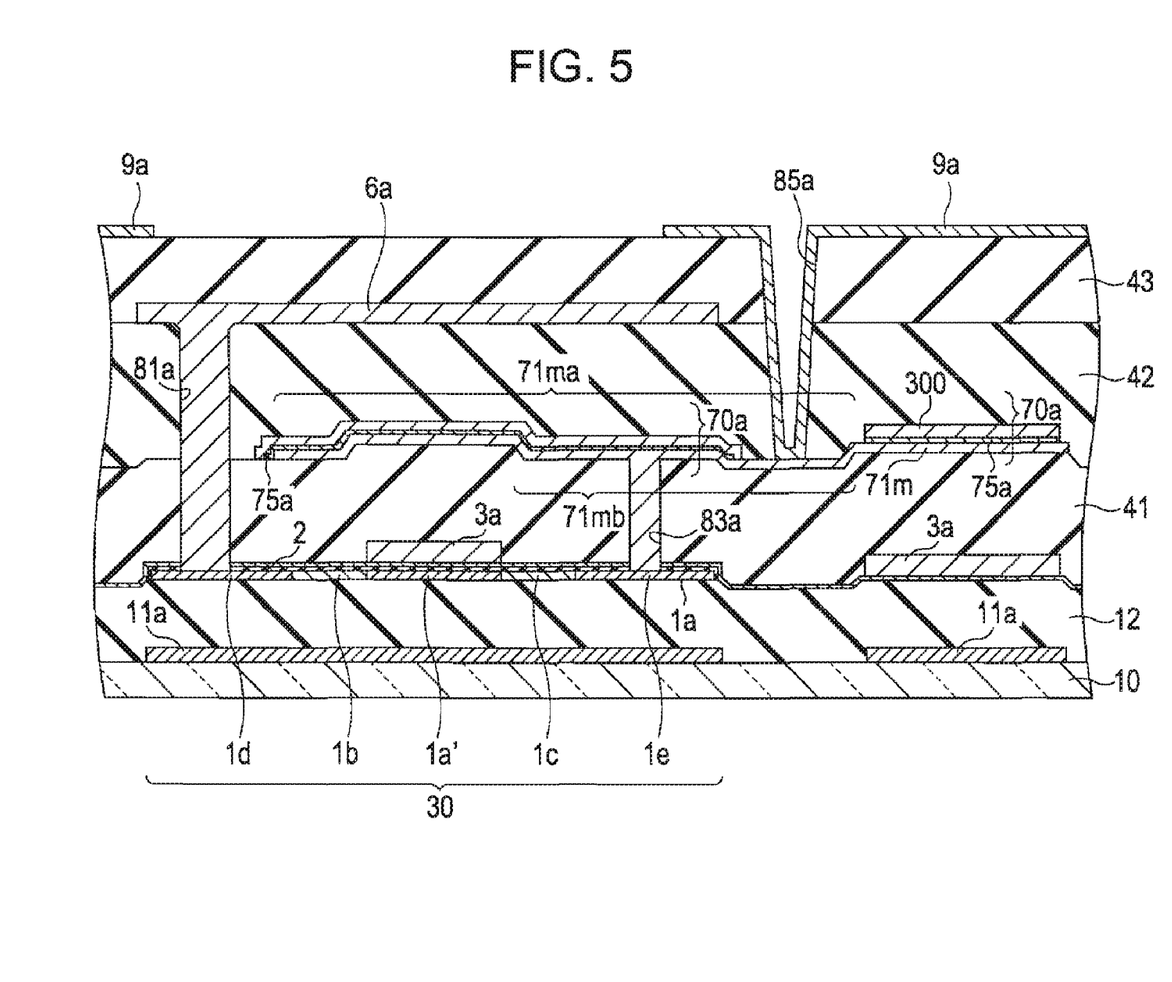
FIG. 5 is a sectional view taken along a line V-V in FIG. 4.

Next, a specific configuration of pixel portions for achieving the operation described above will be described with reference to FIGS. 4 and 5 in addition to FIG. 3. FIG. 4 is a plan view of a plurality of pixel portions adjacent to each other, and FIG. 5 is a sectional view taken along a line V-V in FIG. 4. In FIGS. 4 and 5, individual layers and elements are shown in different scales so that the individual layers and elements can be recognized. This also applies to FIG. 6 described later. Furthermore, FIGS. 4 and 5 show only main components of pixels on the side of the TFT-array substrate 10 in the liquid crystal device. The following description will be directed particularly to the main components in detail.

As shown in FIGS. 3 and 4, the image display region 10a on the TFT-array substrate 10 is formed of a plurality of pixels having the individual pixel electrodes 9a.

On the TFT-array substrate 10, the pixel electrodes 9a are arranged to form a matrix. Furthermore, the data lines 6a and the scanning lines 3a are provided along the vertical and horizontal borders of the pixel electrodes 9a. In FIGS. 3 and 4, the scanning lines 3a extend in an X direction, and the data lines 6a extend in a Y direction so as to cross the scanning lines 3a. At the intersections of the scanning lines 3a and the data lines 6a, the TFTs 30 for pixel switching are provided individually.

The scanning lines 3a, the data lines 6a, the storage capacitors 70a, a lower-side light-blocking film 11a, and the TFTs 30 are disposed in non-aperture regions defining aperture regions of the individual pixels having the pixel electrodes 9a as viewed in plan on the TFT-array substrate 10.

Referring to FIGS. 4 and 5, the TFT 30 has a semiconductor layer 1a and a portion of the scanning line 3a that functions as the gate electrode.

The semiconductor layer 1a is composed of, for example, polysilicon. The semiconductor layer 1a includes a channel region 1a' having a channel length along the Y direction in FIG. 4, a data-line-side LDD region 1b, a pixel-electrode-side LDD region 1c, a data-line-side source-drain region 1d, and a pixel-electrode-side source-drain region 1e. That is, the TFT 30 has an LDD structure. The data-line-side LDD region 1b is an example of a "first junction region" in the invention, and the pixel-electrode-side LDD region 1c is an example of a "second junction region" in the invention.

As shown in FIG. 4, the data-line-side source-drain region 1d and the pixel-electrode-side source-drain region 1e are disposed substantially in mirror symmetry along the Y direction with respect to the channel region 1a'. The data-line-side LDD region 1b is formed between the channel region 1a' and the data-line-side source-drain region 1d. The pixel-electrode-side LDD region 1c is formed between the channel region 1a' and the pixel-electrode-side source-drain region 1e. The data-line-side LDD region 1b, the pixel-electrode-side LDD region 1c, the data-line-side source-drain region 1d, and the pixel-electrode-side source-drain region 1e are formed by doping the semiconductor layer 1a with impurities, for example, by ion implantation. The data-line-side LDD region 1b and the pixel-electrode-side LDD region 1c are doped with impurities lightly compared with the data-line-side source-drain region 1d and the pixel-electrode-side source-drain region 1e, respectively. With these regions doped with impurities, OFF currents that flow through the source region and the drain region when the TFT 30 is OFF are reduced, and reduction of ON currents that flow when the TFT 30 is ON is alleviated. The TFT 30 preferably has an LDD structure. Alternatively, however, the TFT 30 may have an offset structure, in which the data-line-side LDD region 1b and the pixel-electrode-side LDD region 1c are replaced by regions that are not doped with impurities. Yet alternatively, a data-line-side source-drain region and a pixel-electrode-side source-drain region may be formed by self-alignment, i.e., by heavily doping these regions with impurities using a gate electrode as a mask.

Referring to FIGS. 4 and 5, the gate electrode of the TFT 30 is formed as a portion of the scanning line 3a, and is composed of, for example, conductive polysilicon. The scanning line 3a has a main portion extending in the X direction, and a portion extending in the Y direction from the main portion so as to overlap a portion of the channel region 1a' of the TFT 30 that the main portion does not overlap. Of the scanning line 3a, the portion overlapping the channel region 1a' functions as the gate electrode. The gate electrode is electrically insulated from the semiconductor layer 1a by a gate insulating film 2.

On the TFT-array substrate 10, in a layer lower than the layer of the TFTs 30, a lower-side light-blocking film 11a is provided via a base insulating film 12. For example, the lower-side light-blocking film 11a has a shape of a grid pattern. The lower-side light-blocking film 11a shields the channel regions 1a' and of the TFTs 30 and neighboring regions thereof from incident light returning from, the side of the TFT-array substrate 10. The lower-side light-blocking film 11a is composed of, for example, an elementary high-melting metal, such as titanium (Ti), chromium (Cr), tungsten (W), tantalum (Ta), molybdenum (Mo), or palladium (Pd), an alloy, metal silicide, or metal polysilicide including at least one of such high-melting metals, or a lamination of these materials.

The base insulating film 12 insulates the layer of the lower light-blocking film 11a from the layer of the TFTs 30. Furthermore, the base insulating film 12, formed over the entire surface of the TFT-array substrate 10, serves to prevent degradation of the characteristics of the TFTs 30 for pixel switching due to irregularities on the surface of the TFT-array substrate 10 caused by polishing, dirt that remains after cleansing, or the like.

Referring to FIG. 5, in a layer above the layer of the TFTs 30 on the TFT-array substrate 10 via an inter-layer insulating film 41, the storage capacitor 70a is provided. The storage capacitor 70a is formed of a lower capacitor electrode 71m and an upper capacitor electrode 300 opposing each other via a dielectric film 75a, the lower capacitor electrode 71m and the upper capacitor electrode 300 being stacked in that order from the lower side on the TFT-array substrate 10.

The lower capacitor electrode 71 serves as a pixel-potential-side capacitor electrode electrically connected to the pixel-electrode-side source-drain region 1e of the TFT 30 and the pixel electrode 9a. More specifically, the lower capacitor electrode 71m is electrically connected to the pixel electrode 9a via a contact hole 85a, and is electrically connected to the pixel-electrode-side source-drain region 1e via a contact hole 83a. Thus, the lower capacitor electrode 71m relays electrical connection between the pixel-electrode-side source-drain region 1e and the pixel electrode 9a.

The lower capacitor electrode 71m is, for example, an opaque metallic film composed including a metal or alloy and provided on the upper side of the TFT 30. As will be described later, the lower capacitor electrode 71m also functions as an upper light-blocking film (or internal light-blocking film) that shields the TFT 30 from light. The lower capacitor electrode 71m is composed including a metal, such as aluminum (Al) or silver (Ag).

Alternatively, the lower capacitor electrode 71m may be composed of, for example, an elementary high-melting metal, such as titanium (Ti), chromium (Cr), tungsten (W), tantalum (Ta), molybdenum (Mo), or palladium (Pd), an alloy, metal silicide, or metal polysilicide including at least one of such high-melting metals, or a lamination of these materials.

Although not shown in detail in the drawings, the upper capacitor electrode 300 extends from the image display region 10a where the pixel electrodes 9a are disposed to the peripheral region thereof on the TFT-array substrate 10. The upper capacitor electrode 300 is electrically connected to a constant voltage source so that the upper capacitor electrode 300 is maintained at a fixed potential.

The upper capacitor electrode 300 is also an opaque metallic film similarly to the lower capacitor electrode 71m. Thus, the storage capacitor 70a has a metal-insulator-metal (MIM) structure, i.e., a three-layer structure of a metallic film, a dielectric film (insulating film), and a metallic film. With the storage capacitor 70a configured as described above, power consumption by the pair of upper and lower capacitor electrodes 300 and 71m, caused in relation to various signals supplied to the pair of upper and lower capacitor electrodes 300 and 71m, can be reduced. Furthermore, compared with a case where one of the pair of capacitor electrodes is formed of a semiconductor layer, the conductivity of the electrode is improved, so that the performance of the storage, capacitor 70a is improved. This serves to achieve high-speed operation.

As shown in FIGS. 3 and 4, the upper capacitor electrode 300 extends in association with and is shared by a plurality of pixels. Furthermore, at each pixel, as shown in FIG. 4, in a portion extending in the Y direction and located under the scanning line 3a as viewed in FIG. 4, a recessed portion is formed on the side of the contact hole 85a but so as not to overlap the contact hole 85a when viewed in plan on the TFT-array substrate 10.

The dielectric film 75a has a single-layer structure or multi-layer structure formed of a high-temperature-oxide (HTO) film, low-temperature-oxide (LTO) film, or the like composed of silicon oxide, silicon nitride, or the like.

Referring to FIG. 5, on the TFT-array substrate 10, the data line 6 is disposed in a layer above the storage capacitor 70a via an inter-layer insulating film 42.

The data line 6a is electrically connected to the data-line-side source-drain region 1d of the semiconductor layer 1a via a contact hole 81a penetrating through the inter-layer insulating films 41 and 42 and the gate insulating film 2. For example, the data line 6a and the interior of the contact hole 81a are formed of an aluminum (Al) containing material, such as Al—Si—Cu or Al—Cu, elementary Al, a multi-layer film including an Al layer and a titanium nitride (TiN) layer, or the like. The data line 6a also serves to shield the TFT 30 from light. Similarly to the upper capacitor electrode 300, as shown in FIG. 4, at each pixel, the data line 6a has a bent portion bent in the X direction under the scanning line 3a as viewed in FIG. 4 so as not to overlap the contact hole 85a when viewed in plan on the TFT-array substrate 10.

Referring to FIG. 5, the pixel electrode 9a is formed in a layer above the data line 6a via an inter-layer insulating film 43. The pixel electrode 9a is electrically connected to the pixel-electrode-side source-drain region 1e of the semiconductor layer 1a via the lower capacitor electrode 71m and the contact holes 83a and 85a. The pixel electrode 9a is formed so as to extend continuously from the interior of the contact hole 85a to the exterior of the contact hole 85a, and is electrically connected directly to an overlapping portion 71ma of the lower capacitor electrode 71m in the contact hole 85a. The overlapping portion 71ma of the lower capacitor electrode 71m will be described later. With the configuration described above, compared with a case where a plug is formed in the contact hole 85a or a conductive film that serves as a relaying electrode is formed continuously from the interior to the exterior of the contact hole 85a so that the plug or the relaying electrode comes in contact with the pixel electrode 9a, the configuration for electrical connection with the pixel electrode 9a in the contact hole 85a is simplified. Furthermore, compared with a case where the electrical connection between the overlapping portion 71ma and the pixel electrode 9a is achieved via another conductive film, the configuration for electrical connection between the overlapping portion 71ma and the pixel electrode 9a does not become complex due to the additional conductive film and associated conduct hole. Thus, the manufacturing process of the liquid crystal device is simplified. Furthermore, since the relaying electrode or the like mentioned above is not needed for the electrical connection between the pixel electrode 9a and the lower capacitor electrode 71m, a larger region can be allocated for the aperture of each pixel.

On the upper surface of the pixel electrode 9a, an alignment film (not shown in FIG. 5) that has undergone a certain orientation process, such as rubbing, is provided.

The configuration of the pixel portion described above is common to all the pixel portions, as shown in FIG. 4. In the image display region 10a (refer to FIG. 1) on the TFT-array substrate 10, the pixel portions are arranged regularly. Furthermore, in the liquid crystal device according to this embodiment, in the peripheral region on the TFT-array substrate 10, peripheral circuits such as the scanning-line driving circuits 104 and the data-line driving circuit 101 are provided, as described with reference to FIGS. 1 and 2.

Figure 6:
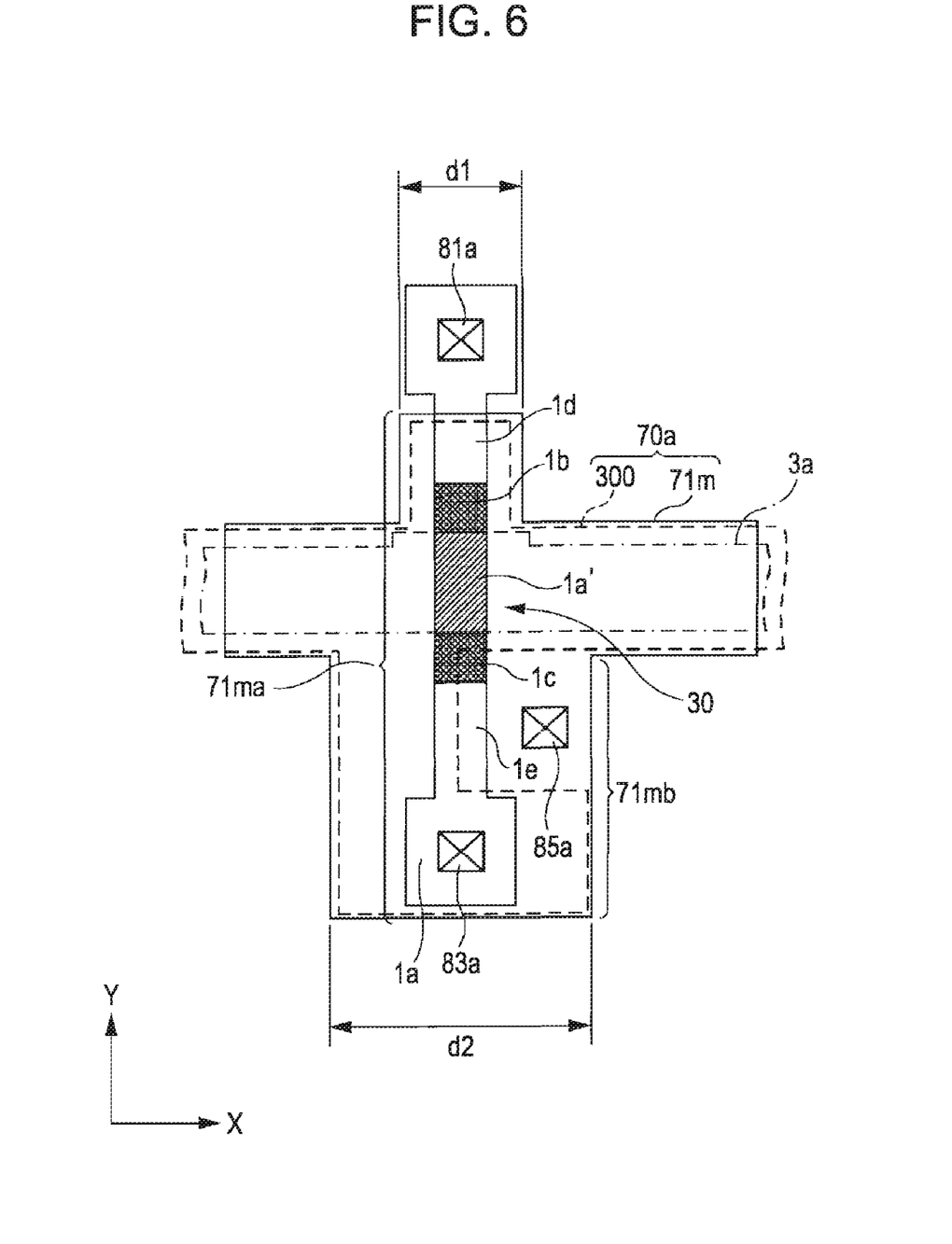
FIG. 6 is a plan view showing a pair of capacitor electrodes forming a storage capacitor.

Next, the configuration of the storage capacitor 70a, which functions as a light-blocking portion in the liquid crystal device according to this embodiment, will be described in detail with reference to FIG. 6 in addition to FIGS. 1 to 5. FIG. 6 is a plan view showing the pair of electrodes forming the storage capacitor 70a in the liquid crystal device according to this embodiment. FIG. 6 schematically shows the configuration of the elements of the pixel portion shown in FIG. 4, particularly regarding the layout relationship among the TFT 30, the scanning line 3a, and the storage capacitor 70a.

In the liquid crystal device according to this embodiment, the scanning line 3a, the data line 6a, the storage capacitor 70a, and the lower-side light-blocking film 11a on the side of the TFT-array substrate 10 are formed of light-blocking conductive films. Thus, in addition to the light-blocking film 23 on the side of the opposing substrate 20, described with reference to FIG. 2, these elements on the side of the TFT-array substrate 10 define the aperture region at each pixel. Particularly, referring to FIGS. 4 and 6, the upper and lower capacitor electrodes 300 and 71m of the storage capacitor 70a are formed of metallic films so that the upper and lower capacitor electrodes 300 and 71m block light, and the upper and lower capacitor electrodes 300 and 71m partially defines the aperture region at each pixel. According to this embodiment, the storage capacitor 70a also functions as a light-blocking portion, so that the configuration of the elements of each pixel is simplified.

Furthermore, referring to FIG. 6, the lower capacitor electrode 71m of the storage capacitor 70a has an overlapping portion 71ma disposed in a layer above the semiconductor layer 1a of the TFT 30 and overlapping at least a portion of the semiconductor layer 1a along the Y direction when viewed in plan on the TFT-array substrate 10. More specifically, when viewed in plan, the overlapping portion 71ma is provided so as to overlap a portion of the data-line-side source-drain region 1d and so as to extend along the Y direction in FIG. 6 from the portion of the data-line-side source-drain region 1d and overlap a portion of the semiconductor layer 1a including the data-line-side LDD region 1b, the channel region 1a', the pixel-electrode-side LDD region 1c, and the pixel-electrode-side source-drain region 1e provided under the portion of data-line-side source-drain region 1d as viewed in FIG. 6. Thus, according to this embodiment, at each pixel on the TFT-array substrate 10, the portion of the semiconductor layer 1a is shielded from incident light, so that the amount of light that enters the semiconductor layer 1a can be reduced. This serves to reduce light leakage current generated in the semiconductor layer 1a of the TFT 30.

Particularly, in the overlapping portion 71ma, a portion extending under the scanning line 3a along the Y direction in FIG. 6, including a portion overlapping the pixel-electrode-side LDD region 1c of the semiconductor layer 1a, is formed as a wider portion 71m b so that a width d2 thereof in the X direction along the surface of the TFT-array substrate 10 is larger than a width d1 in the same direction of the other portion of the overlapping portion 71ma. According to researches conducted by the inventors of the invention, empirically, light leakage currents are more likely to occur in the pixel-electrode-side LDD region 1c than in the data-line-side LDD region 1b during operation of the TFT 30. In the overlapping portion 71ma, a wider range of the pixel-electrode-side LDD region 1c of the semiconductor layer 1a along the X direction is shielded from incident light by the wider portion 71mb, so that the amount of light that enters the pixel-electrode-side LDD region 1c of the semiconductor layer 1a can be reduced further. This serves to reduce light leakage currents in the TFT 30 more effectively.

In this embodiment, referring to FIGS. 4 to 6, the contact hole 85a formed through the inter-layer insulating film 43 is located so as to overlap the wider portion 71mb of the overlapping portion 71ma of the lower capacitor electrode 71m when viewed in plan on the TFT-array substrate 10. Thus, according to this embodiment, at the storage capacitor 70a, the non-aperture region need not be extended unnecessarily for the purpose of providing the contact hole 85a in portions other than the portion of the non-aperture region defined by the overlapping portion 71ma of the lower capacitor electrode 71m. Particularly, in the overlapping portion 71ma of the lower capacitor electrode 71m, in order to prevent occurrence of light leakage currents in the pixel-electrode-side LDD region 1c, the wider potion 71mb defines a region where the semiconductor layer 1a is shielded from incident light. Furthermore, the contact hole 85a is provided in the light-blocking region defined as described above. Thus, it is possible to avoid unnecessarily extending the size of the overlapping portion 71ma in portions other than the wider portion 71mb. Furthermore, for example, during manufacturing of the liquid crystal device, it is readily possible to properly locate the contact hole 85a relative to the overlapping portion 71ma. This leads to a manufacturing advantage that reduction of the yield due to misalignment of the contact hole 85a can be prevented.

In the liquid crystal device according to the embodiment described above, it is possible to allocate a larger aperture region to improve the numerical aperture at each pixel while alleviating occurrence or light leakage currents. This serves to improve the quality of display.

Electronic Apparatus

Figure 7:
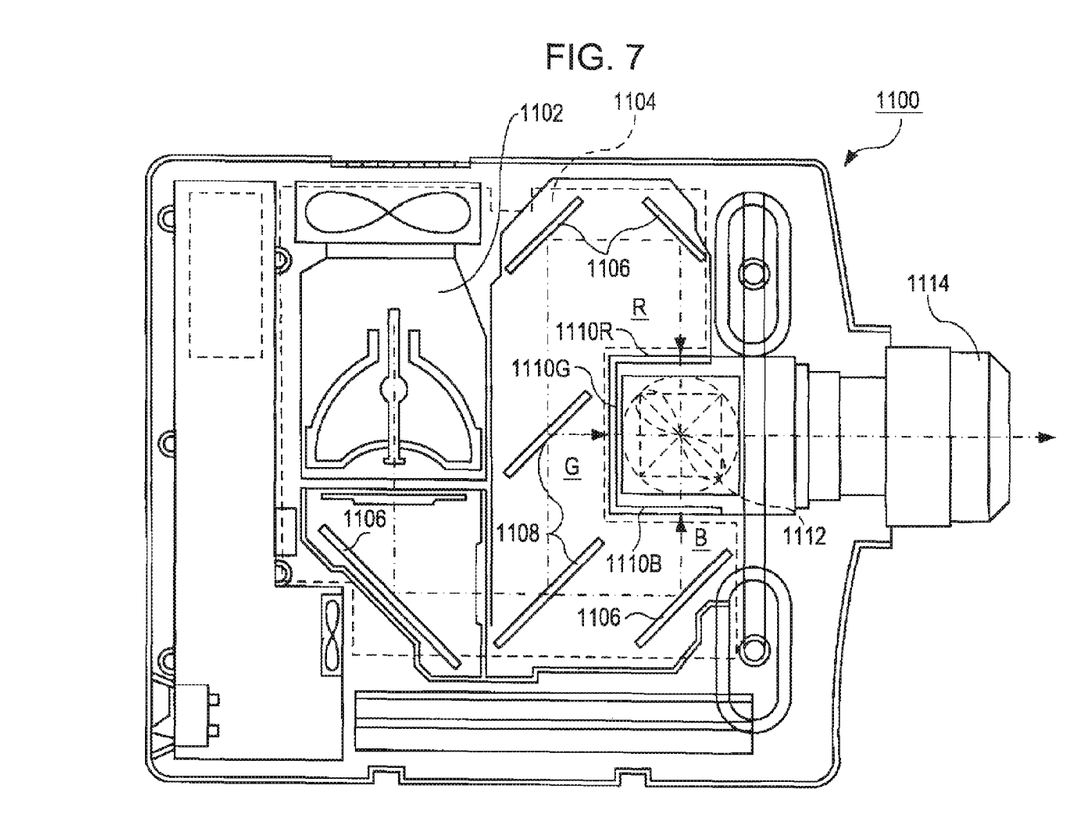
FIG. 7 is a plan view showing the configuration of a projector as an example of an electronic apparatus including an electro-optical device.

Next, application of the liquid crystal device as an electro-optical device to various electronic apparatuses will be described. FIG. 7 is plan view showing an example configuration of a projector including light valves each implemented by the liquid crystal device.

Referring to FIG. 7, inside a projector 1100, a lamp unit having a white light source, such as a halogen lamp, is provided. Light emitted from the lamp unit 1102 is separated into components of the three primary colors of RGB by four mirrors 1106 and two dichroic mirrors 1108 disposed in a light guide 1104, and the R, B, and G components enter liquid crystal panels 1110R, 1110B, and 1110G as light valves, respectively.

The liquid crystal panels 1110R, 1110B, and 1110G are each configured the same as the liquid crystal device described above, and are driven respectively by primary-color signals of R, B, and G supplied from an image-signal processing circuit. Light components that have been modulated by these liquid crystal panels 1110R, 1110B, and 1110G enters a dichroic prism from three directions. The dichroic prism 1112 causes the R and B light components to refract by an angle of 90 degrees while causing the G light component to go straight. Thus, by combining images of the respective colors, a color image is projected onto a screen or the like via a projection lens 1114.

Considering the respective images displayed by the liquid crystal panels 1110R, 1110B, and 1110G, the image displayed by the liquid crystal panel 1110G has to be flipped left-for-right with respect to the images displayed by the liquid crystal panels 1110R and 1110B.

Since the liquid crystal panels 1110R, 11108, and 1110G receive light components of the primary colors of R, B, and G via the dichroic mirrors 1108, respectively, color filters need not be provided.

Without limitation to the electronic apparatus described with reference to FIG. 7, the liquid crystal device can be used in various other electronic apparatuses, such as mobile personal computers, cellular phones, liquid crystal television sets, view-finder or monitor-direct-viewing video tape recorders, car navigation sets, pagers, electronic notebooks, electronic calculators, word processors, workstations, video phones, point-of-sale (POS) terminals, or apparatuses having touch panels.

The invention is not limited to the embodiments described above, and various modifications can be made without departing from the gist or spirit of the invention as understood from the claims and the specification as a whole. Electro-optical devices involving such modifications and electronic apparatuses including such electro-optical devices also fall within the scope of the invention.

The entire disclosure of Japanese Patent Application No. 2006-201666, filed Jul. 25, 2006 is expressly incorporated by reference herein.

What is claimed is:

1. An electro-optical device comprising:

a substrate;

a plurality of data lines and a plurality of scanning lines provided on the substrate and crossing each other;

a plurality of pixel electrodes provided on the substrate at a plurality of pixels, the plurality of pixels being defined in association with intersections of the plurality of data lines and the plurality of scanning lines and constituting a display region on the substrate;

a plurality of transistors that controls switching of the plurality of pixel electrodes, the plurality of transistors being provided on the substrate in non-aperture regions separating aperture regions of the plurality of pixels each other, each of the plurality of transistors being formed along a first direction in the display region; and a plurality of light-blocking portions provided on the substrate, the plurality of light-blocking portions being formed in a layer below the plurality of pixel electrodes via an inter-layer insulating film and above the plurality of transistors so as to define the non-aperture regions at least partially, each of the plurality of light-blocking portions having an overlapping portion, one of the overlapping portions including a portion that overlaps an associated one of the plurality of transistors along the first direction when viewed in plan on the substrate and being wider than the associated one of the plurality of transistors along a second direction crossing the first direction; wherein:

an associated one of the plurality of pixel electrodes is electrically connected to the associated one of the plurality of transistors via a contact hole formed through the inter-layer insulating film;

the one of the overlapping portions further including:

a first portion located on a opposite side of an associated one of the scanning lines in the first direction as the contact hole, and a second portion located on a same side of the associated one of the scanning lines in the first direction as the contact hole, a width of the second portion being wider than a width of the first portion in the second direction; and the contact hole overlapping the second portion in plan view.

2. The electro-optical device according to claim 1, wherein each of the plurality of light-blocking portions is formed of a light-blocking conductive material, an associated one of the plurality of light-blocking portions is electrically connected to the associated one of the plurality of transistors, and the associated one of the plurality of light-blocking portions is electrically connected to the associated one of the plurality of pixel electrodes via the contact hole.

3. The electro-optical device according to claim 1, wherein the associated one of the plurality of transistors includes a semiconductor layer having a channel region, a data-line-side source-drain region electrically connected to the associated one of the plurality of data lines, a pixel-electrode-side source-drain region electrically connected to an associated one of the plurality of pixel electrodes, a first junction region formed between the channel region and the data-line-side source-drain region, and a second junction region formed between the channel region and the pixel-electrode-side source-drain region, and the second portion overlaps at least the second junction region when viewed in plan on the substrate.

4. The electro-optical device according to claim 3, wherein the second junction region is a lightly doped drain region.

5. The electro-optical device according to claim 2, wherein the associated one of the plurality of light-blocking portions is a capacitor having a lower capacitor electrode and an upper capacitor electrode stacked in that order from a lower side on the substrate, one electrode of the lower capacitor electrode and the upper capacitor electrode being electrically connected to the associated one of the plurality of pixel electrodes, and the one of the overlapping portions is formed as a portion of the one electrode.

6. The electro-optical device according to claim 5, wherein the one electrode is the lower capacitor electrode.

7. The electro-optical device according to claim 5, wherein each of the upper capacitor electrode and the lower capacitor electrode is formed of a metallic film.

8. An electronic apparatus comprising the electro-optical device according to claim 1.

* * * * *